United States Patent
Prus et al.

(10) Patent No.: US 7,535,794 B2
(45) Date of Patent: May 19, 2009

(54) TRANSDUCER SURFACE MAPPING

(75) Inventors: Oleg Prus, Haifa (IL); Shuki Vitek, Haifa (IL)

(73) Assignee: Insightec, Ltd., Tirat Carmel (IL)

( * ) Notice: Subject to any disclaimer, the term of this patent is extended or adjusted under 35 U.S.C. 154(b) by 200 days.

(21) Appl. No.: 11/668,321

(22) Filed: Jan. 29, 2007

(65) Prior Publication Data

US 2008/0031090 A1 Feb. 7, 2008

Related U.S. Application Data

(60) Provisional application No. 60/821,122, filed on Aug. 1, 2006.

(51) Int. Cl.
*H04B 17/00* (2006.01)
*G01K 11/32* (2006.01)

(52) U.S. Cl. ........................................... 367/13

(58) Field of Classification Search ............... 367/13, 367/103, 105; 73/1.01; 342/165
See application file for complete search history.

(56) References Cited

U.S. PATENT DOCUMENTS 3,942,150 A * 3/1976 Booth et al. ............... 367/13
4,454,597 A * 6/1984 Sullivan .................... 367/13
4,893,284 A * 1/1990 Magrane ................... 367/13
5,617,371 A * 4/1997 Williams ................... 367/13
6,543,272 B1   4/2003 Vitek
2008/0031090 A1* 2/2008 Prus et al. ................. 367/13

FOREIGN PATENT DOCUMENTS

WO    WO/2008/015523   * 2/2008

* cited by examiner

*Primary Examiner*—Dan Pihulic
(74) *Attorney, Agent, or Firm*—Goodwin Procter LLP (57) ABSTRACT

Method for adjusting the output of a phased array ultrasonic transducer using surface mapping. The transducer surface is mapped using a sensor, such as a hydrophone, to determine the actual location of each transducer element relative to the expected location of each transducer element. Mapping can be performed by measuring a distance between a hydrophone and each transducer element. At least one of the hydrophone and the transducer are moveable relative to each other to map the transducer surface. A determination is made whether the actual location of a transducer element differs from the expected location. Drive signals of certain transducer elements having actual locations that differ from expected locations are adjusted to control the output of the transducer.

31 Claims, 10 Drawing Sheets

| | | |
|---|---|---|
| $X_{E1}$ | $Y_{E1}$ | $Z_{E1}$ |
| $X_{E2}$ | $Y_{E2}$ | $Z_{E2}$ |
| $X_{E3}$ | $Y_{E3}$ | $Z_{E3}$ |
| $X_{E4}$ | $Y_{E4}$ | $Z_{E4}$ |

1st File (Expected)

FIG. 16B

| | | |
|---|---|---|
| $X_{A1}$ | $Y_{A2}$ | $Z_{A3}$ |
| $X_{E2}$ | $Y_{E2}$ | $Z_{E2}$ |
| $X_{A3}$ | $Y_{A3}$ | $Z_{A3}$ |
| $X_{E4}$ | $Y_{E4}$ | $Z_{E4}$ |

2nd File (Expected) (Actual)

FIG. 16C

| | | |
|---|---|---|
| $X_{A1}$ | $Y_{A1}$ | $Z_{A1}$ |
| $X_{A2}$ | $Y_{A2}$ | $Z_{A2}$ |
| $X_{A3}$ | $Y_{A3}$ | $Z_{A3}$ |
| $X_{A4}$ | $Y_{A4}$ | $Z_{A4}$ |

2nd File (Actual)

FIG. 17

TRANSDUCER SURFACE MAPPING

CROSS REFERENCE TO RELATED APPLICATION

This application claims the benefit under 35 U.S.C. 119 to U.S. Provisional Application No. 60/821,122, filed on Aug. 1, 2006, the contents of which are incorporated herein by reference.

FIELD OF THE INVENTION

The present invention relates generally to performing non-invasive surgical procedures using ultrasonic energy, and, more particularly, to a method and system for mapping the surface of a multi-element transducer array.

BACKGROUND

High intensity focused acoustic waves, such as ultrasonic waves (acoustic waves with a frequency greater than about 20 kilohertz), may be used to therapeutically treat internal tissue regions within a patient. For example, ultrasonic waves may be used to ablate tumors rather than requiring the patient to undergo invasive surgery. For this purpose, piezo-ceramic transducers are driven by electric signals to produce ultrasonic energy and are placed externally to the patient but in close proximity to the tissue to be ablated. The transducer can be geometrically shaped and positioned such that the ultrasonic energy is focused at a "focal zone" corresponding to a target tissue region within the patient. The target tissue region is heated until the tissue is necrosed. The transducer may be sequentially focused and activated at a number of focal zones in close proximity to one another.

This series of sonications is used to cause coagulation necrosis of a tissue structure, such as a tumor, without damaging surrounding tissue. To achieve this, ultrasonic energy must be properly focused and applied to the correct location. Further, the ultrasonic beam must have a suitable sharpness and shape so that unexpected hot spots outside the tumor zone are not generated.

One important factor impacting the effectiveness of the transducer and the therapy provided to the patient is the ability to accurately and reliably shape the transducer beam and focus the output of the transducer at the focal zone corresponding to the target tissue. Transducer elements that are not properly configured or controlled can lead to improper focus location and reduced focus quality, resulting in less effective therapy. Further, they can result in secondary hot spots or concentrated areas of heating beyond the focal zone, which can cause damage to surrounding healthy tissue.

One source of transducer output errors results from transducer elements moving or shifting from their expected location. For example, assuming a transducer has a spherical shape, the software that drives each transducer element is typically configured to activate individual transducer elements based on the elements being positioned according to a spherical model or design. In practice, however, transducer elements often are not positioned according to a spherical model. Instead, the actual location of one or more transducer elements may be shifted from their expected locations during manufacturing, use and repair. Further, the location of transducer elements can shift as a result of the element being deformed by heat. These changes can result in permanent focusing errors that are not compensated by software that is programmed to drive individual elements based on a pre-determined spherical model Even slight location deviations can have significant effects on the quality of the transducer output and may cause secondary hot spots. For example, FIG. 1 generally illustrates a cross-sectional view of a surface of a spherical transducer 10 having a distortion or deviation 12. Thus, the actual location 14 of the transducer surface is shifted downwardly from the expected location 16 that is based on a pre-determined spherical model. In this example, the distortion is greatest at the middle of the transducer 10 and is one-dimensional or vertical. FIG. 2 illustrates another example of a spherical transducer 20 having another type of distortion 22. This type of distortion 22 is similar to the distortion 12 shown in FIG. 1 except that the distortion 22 is less pronounced at the middle of the transducer. This type of distortion 22 can also cause focus errors, as well as secondary hot spots.

Figure 1:
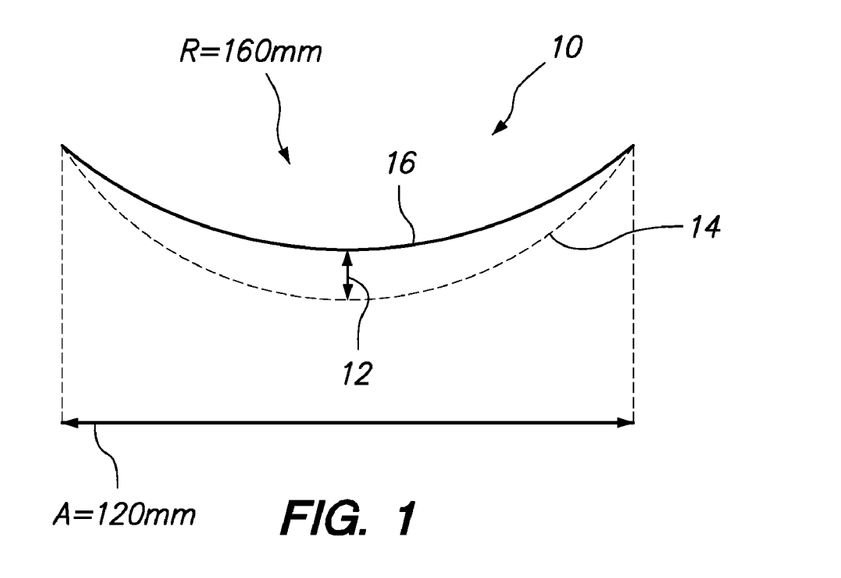
FIG. 1 is a cross-sectional view of a surface of known spherical cap transducer that includes a distortion that alters the output of a transducer.
Figure 2:
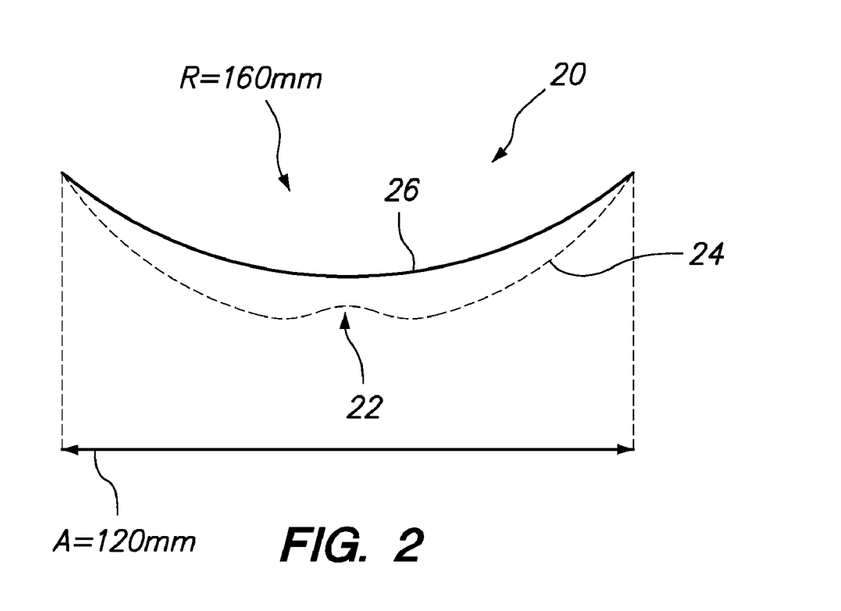
FIG. 2 is a cross-sectional view of a surface of another known spherical cap transducer having a different type of distortion that alters the output of a transducer.

With reference to FIG. 1, for example, a transducer 10 having a deviation "δ" of about 1 mm, a radius of curvature "R" of about 160 mm and an aperture "A" of about 120 mm can cause the location of the ultrasonic output to be shifted by about 13 mm. In other words, a relatively small deviation can alter the output of a transducer in such a manner that the resulting change in the output is substantially larger than the deviation itself.

Additionally, even if the physical structure of the transducer surface is as expected, individual transducer elements can be wired improperly, e.g., at the time of manufacture or during service. Improper wiring can result in transducer elements being driven by signals intended for other transducer elements, thereby causing location and focus errors.

One attempt to solve these problems involves focusing the transducer in water at a focal point and using a hydrophone to locate the focal point of maximum intensity. Each transducer element is then separately activated at the maximum intensity point, and the phase of each signal is measured. The measured phase for each element is compared to the expected phase, and the driving signal is adjusted to compensate for the phase deviation. This "phase measurement and phase adjustment" approach, however, has a number of shortcomings.

One shortcoming is that this technique applies to focus locations that are close to the location of the focal point during calibration. However, phased array transducers allow electronic steering of the focal point, and this technique may not be effective when the location of the focal point is steered to different locations beyond the point used during calibration. Moreover, this technique requires an accurate scanner and electronics in order to locate the focal point. Consequently, the "phase measurement and phase compensation" approach can be time consuming and may not be practical during actual use in the field.

Thus, while known transducer arrays have been successfully used in the past, they can be improved, particularly the manner in which variations in transducer element location caused by movement and deformations are compensated to maintain the quality of the transducer output while reducing or eliminating secondary hot spots.

SUMMARY

One embodiment is directed to a method of mapping a surface of a multi-element transducer, such as a phased array ultrasonic transducer. The method includes measuring a time of flight of a pulse emitted from each transducer element and detected by a sensor. The method further includes determining a distance between each transducer element and the sensor based on the time of flight, and determining the actual location of each transducer element based on the determined distance.

Another embodiment is directed to a method of controlling an output of a multi-element ultrasonic transducer using surface mapping. The method includes mapping a surface of the transducer by determining an actual location of each transducer element of the transducer and adjusting a drive signal of one or more transducer elements based on a comparison of the actual location and the expected location of each transducer, thereby adjusting the output of the transducer.

A further alternative embodiment is directed to a method of controlling an output of a multi-element ultrasonic transducer that includes generating an initial file having an expected location of each transducer element of the transducer based on a shape or design of a surface of the transducer and mapping the surface of the transducer by determining, for each transducer element, an actual location of the transducer element relative to an expected location of the transducer element. The method further includes comparing the actual locations of the transducer element to respective expected locations of the transducer elements and generating an updated file including actual locations of transducer elements having an actual location that deviates from the expected location. Drive signals of transducer elements are adjusted using the updated file to adjust the transducer output.

In one or more embodiments, a distance between each transducer element and a sensor, such as a hydrophone or hydrophone array, can be performed by measuring a time of flight of a pulse emitted by a transducer element and detected by a sensor. The sensor or the transducer can be moved so that a time of flight measurement is conducted at a second location. In embodiments in which a hydrophone array is used, a first hydrophone of the array can be activated for measuring a first time of flight of a pulse emitted by a transducer element and detected by the first hydrophone and determining a first distance between the transducer element and the first hydrophone based on the measured first time of flight. A second hydrophone of the array can be activated for measuring a second time of flight of a pulse emitted by the transducer element and detected by the second hydrophone and determining a second distance between the transducer element and the second hydrophone based on the measured second time of flight. The determined first and second distances can be used to determine the actual location of the transducer element. The hydrophones can be active at the same or different times, e.g., they can be sequentially active.

Drive signals of certain transducers can be adjusted if the actual location of those transducers deviates from their expected locations, whereas drive signals for other transducers can remained unchanged. The adjusted drive signals can be used to adjust a focus or a shape of a beam generated by the transducer.

Other objects and features of embodiments will become apparent from consideration of the following description taken in conjunction with the accompanying drawings.

BRIEF DESCRIPTION OF THE DRAWINGS

Embodiments are illustrated by way of example, and not by way of limitation, in the figures of the accompanying drawings, in which like reference numerals refer to like components, and in which.

DETAILED DESCRIPTION OF ILLUSTRATED EMBODIMENTS

Embodiments improve prior transducer control systems by mapping the transducer surface to determine whether the drive signals of individual transducer elements should be corrected or adjusted to adjust the output of the transducer elements. Transducer elements that have not shifted or deformed and that occupy their expected positions can be controlled according to the expected location data or coordinates, e.g., based on a design of the transducer. Other transducer elements that have shifted or that have been deformed can be adjusted using actual location data or coordinates rather than the expected location data, which no longer accurately represents the true position of these transducer elements. Thus, the drive signals and outputs of certain or selected transducer elements can be adjusted to compensate for surface deviations so that transducer elements can be activated to generate a desired transducer output. Further, controller records or files can be updated to reflect actual wiring configurations, e.g., to correct incorrect wiring.

Figure 3:
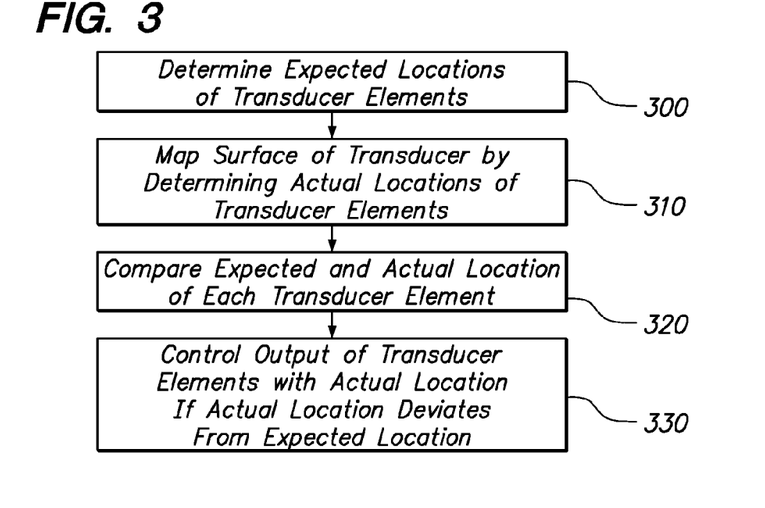
FIG. 3 is a flow chart illustrating one embodiment of a method for controlling the output of a transducer.

FIG. 3 illustrates a method for adjusting the drive signals and output of an ultrasonic transducer using surface mapping according to one embodiment. In step 300, the expected location or position (generally "location") of each transducer element is determined, for example, based on the design of the transducer. The expected location of an element can be expressed as a coordinate. In step 310, the surface of the transducer is mapped. This is done by determining the actual location of each transducer element. In step 320, after the actual location of each element is determined, a comparison is made between the expected location of an element and the actual location of the element to determine whether the actual location deviates from the expected location. In step 330, the actual location of certain transducer elements having a location that deviates from the expected location and the expected location of other elements that are properly positioned are used to control the drive signals and outputs of the respective transducer elements. An actual transducer element location may be used if the actual location deviates from the expected location by any degree. Alternatively, the actual location can be used if it deviates from the expected location by a predetermined amount, e.g., if the deviation is greater than the predetermined amount.

Embodiments compensate for certain transducer elements that are not properly positioned or wired by using the actual location of these transducer elements, while allowing other transducer elements to be controlled with the original or expected location data. Thus, the location and focus of the transducer output are improved compared to known systems, which use only the data based on the initial or expected design of the transducer even if the actual locations of various elements have changed so that the initial or expected design is not accurate. Further aspects of embodiments and alternative embodiments are discussed in further detail below with reference to FIGS. 4-17.

Figure 4:
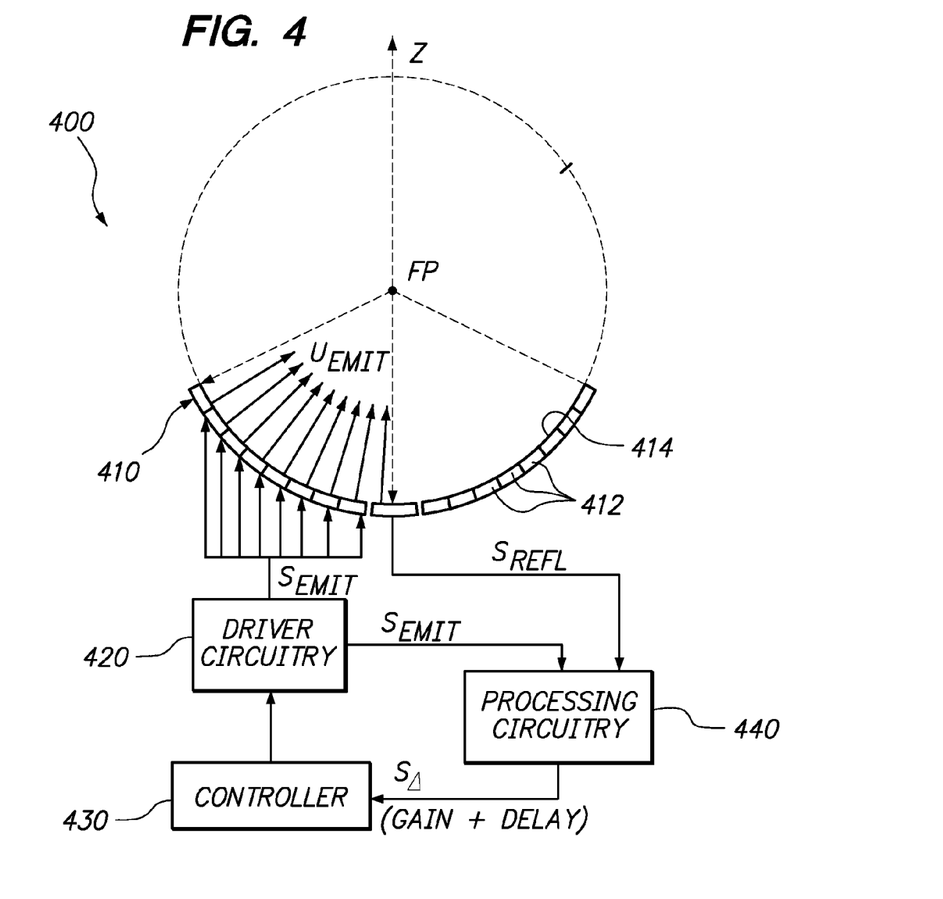
FIG. 4 is a schematic view of an ultrasonic therapy system in which embodiments can be used to control the output of a transducer.

Referring to FIG. 4, one suitable focused ultrasound system 400 with which method and system embodiments can be used includes an ultrasonic transducer 410 for emitting ultrasonic energy, driver circuitry 420 for providing electrical drive signals to the transducer 410, and a controller 430 for controlling the characteristics of the drive signals output from the driver circuitry 420, and thus, the characteristics of the emitted ultrasonic energy ($U_{EMIT}$). The transducer 410 includes a plurality of transducer elements 412. Each transducer element 412 is individually coupled to the driver circuitry 420, which provides electrical drive signals to the transducer elements 412 at a plurality of discrete frequencies, preferably at radio frequencies (RF), for example, between about 0.15 to about 3 MHz for medical therapeutic applications, preferably about 0.22 MHz. When drive signals are provided to the transducer elements 412, the transducer 410 emits ultrasonic energy from the inside surface 414. The controller 430 is coupled to the driver circuitry 420 for controlling several aspects of the drive signals generated by the driver circuitry 420, such as the frequency, phase, and/or amplitude, with associated processing circuitry 440.

Figure 5:
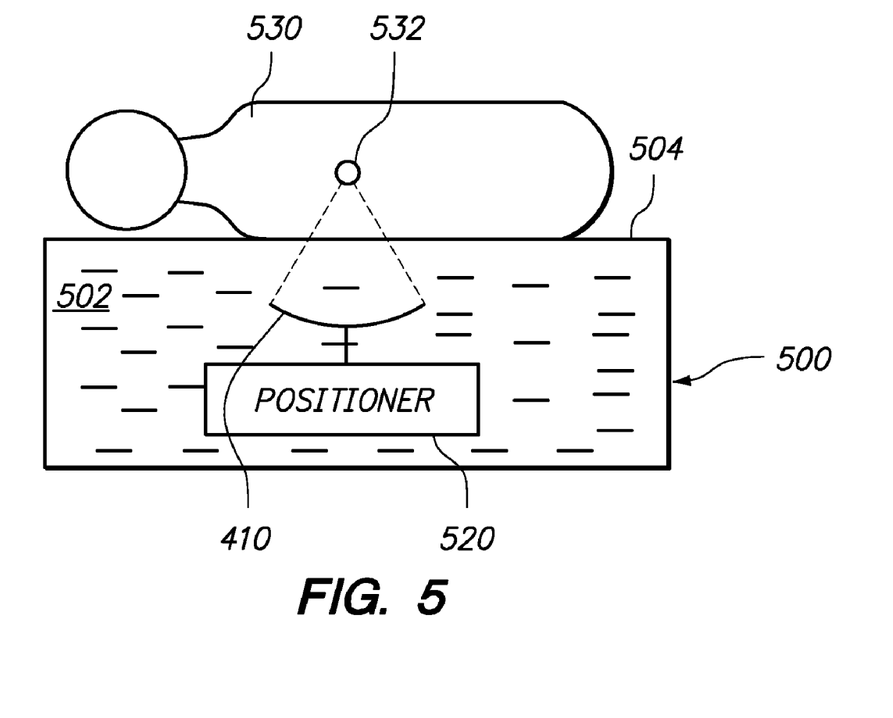
FIG. 5 is a schematic side view of a patient on a water-filled table having an ultrasonic transducer that can be controlled using various embodiments.

Referring to FIG. 5, the transducer 410 can be mounted within a fluid-filled casing 500, such as a table. The table 500 includes a chamber 502 that is filled with degassed water or a similar acoustically transmitting fluid. The transducer 410 can be connected to a positioning system 520 that moves the transducer 410 within the chamber 502 and adjusts the geometric focal point 532 of the transducer 410. For example, the positioning system 520 may be configured to move the transducer 410 within the chamber 502 in any one of three orthogonal directions, e.g., horizontally forward and backward, horizontally side-to-side, and vertically.

The top of the table 500 includes a flexible membrane 504 that is substantially transparent to ultrasound, such as a mylar plastic or polyvinyl chloride (PVC) sheet. In addition, a flexible, fluid-filled bag (not shown) is generally provided along the top of the table that may conform easily to the contours of a patient 530 lying on the table 500. The transducer 410 may also be mounted in a fluid-filled bag mounted on a movable arm (not shown) that is placed in contact with a patient 530. During use, the patient 530 may lie on the table 500 with water, ultrasonic conducting gel, and the like applied between the patient 530 and the bag or membrane 504, thereby acoustically coupling the patient 530 to the transducer 410. A matching layer (not shown) can be used to improve the coupling of energy from the transducer elements 412 into the body of the patient 530 by matching the higher acoustical impedance elements 412 to the lower acoustical impedance of the patient 530.

The transducer 410 output may be focused towards a target tissue region 532 within a tissue structure, such as a cancerous or benign tumor. The transducer 410 may be activated by supplying a set of drive signals from the driver circuitry 420 to the transducer 410 to focus the emitted ultrasonic energy at the target tissue region 532. The transducer 410 may be deactivated, for example, for sufficient time to allow heat absorbed by the patient's tissue to dissipate. The transducer 410 output may then be focused on another target tissue region, and the process repeated until the entire tissue structure is ablated.

Additional information concerning one suitable system 400 is provided in U.S. Pat. No. 6,543,272, the contents of which are incorporated herein by reference. Persons skilled in the art will appreciate that embodiments can also be used with other systems, and that the focused ultrasound system 400 shown in FIGS. 4 and 5 is but one example of a suitable system.

Figure 6:
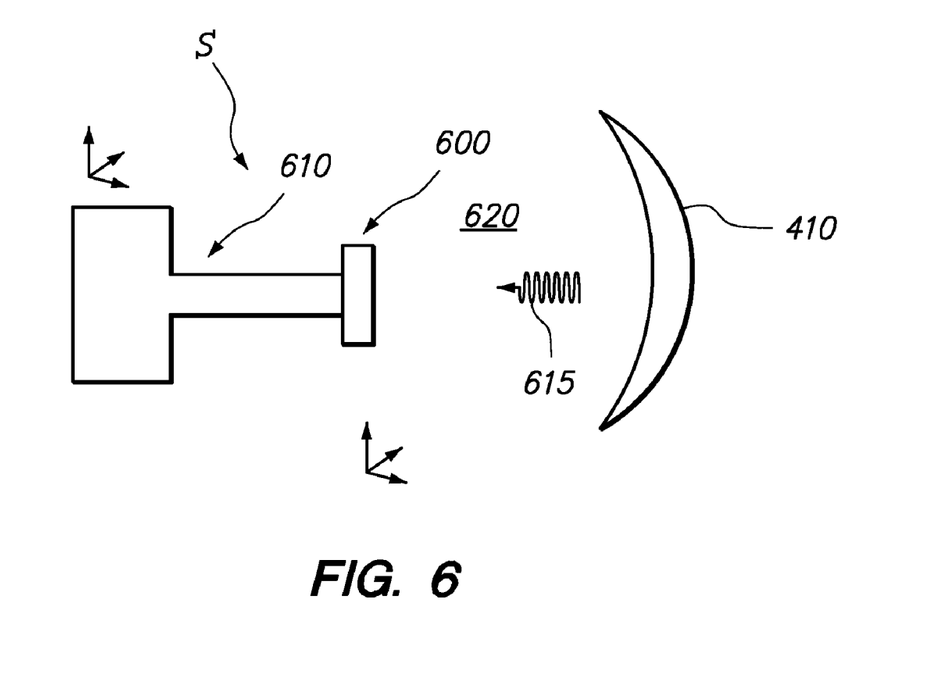
FIG. 6 illustrates a system for mapping a surface of an ultrasonic transducer in which a sensor is moved or translated relative to a fixed transducer according to one embodiment.

Referring to FIG. 6, according to one embodiment, a system S for mapping an inner surface 414 of a multi-element transducer 410 and adjusting the drive signals and transducer output 410 includes a sensor 600 and a scanner or a translatable support 610. Other components can be used to move a sensor 600, but this specification refers to a scanner 610 for purposes of explanation.

According to one embodiment, the sensor 600 is a hydrophone. During use, a transducer element 412 is activated for a short duration, e.g., about 20 cycles or other suitable duration, referred to hereafter as a pulse 615. The hydrophone 600 is arranged to detect the pulse 615 through water or another suitable medium 620. After detecting a first pulse 615, the scanner 610 translates or moves the hydrophone 600 from a first position to a second position in one, two and/or three directions relative to a fixed transducer 410. In the illustrated embodiment, the scanner 610 is translatable in three dimensions; however, a scanner 610 may also move hydrophone 600 in one and two directions as necessary.

Figure 7:
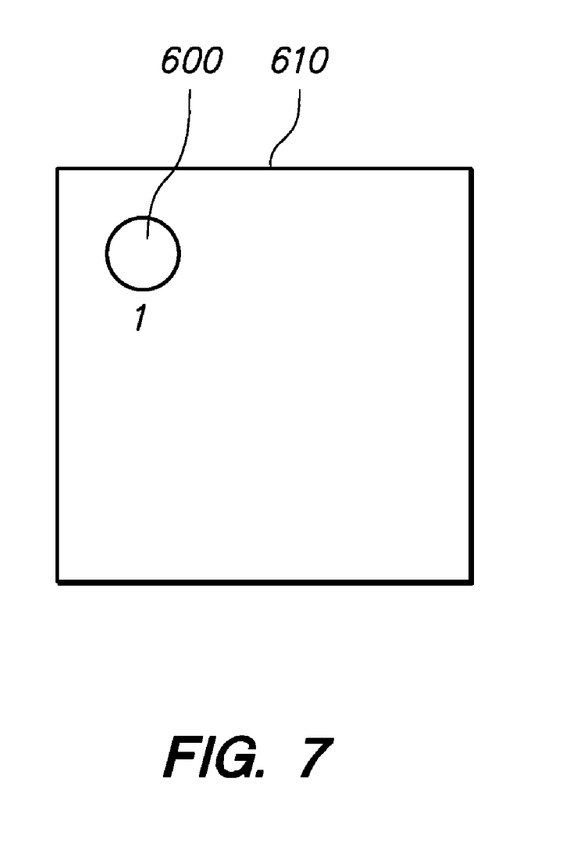
FIG. 7 illustrates a sensor supported by a scanner.
Figure 8:
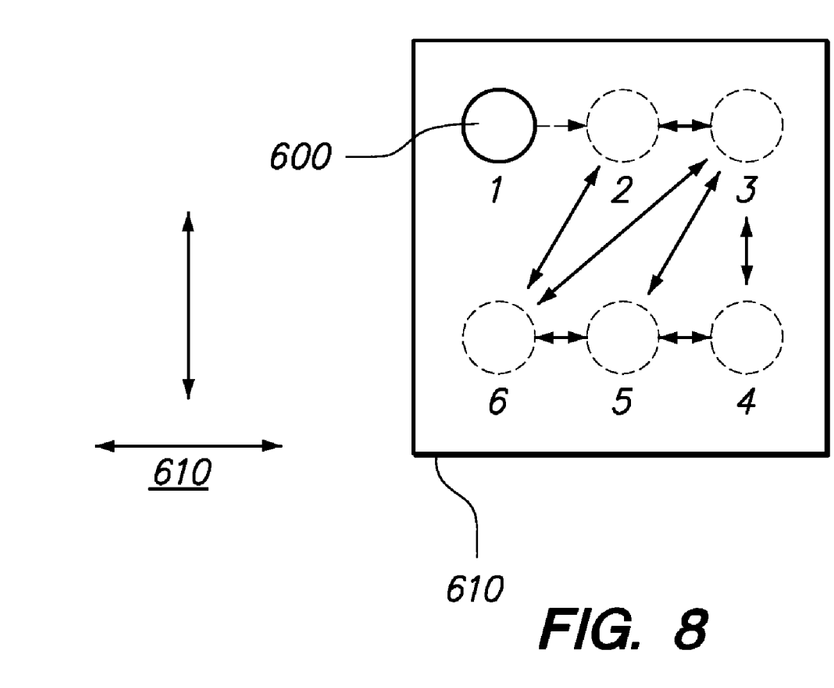
FIG. 8 illustrates the scanner of FIG. 7 being translated to move the sensor to different positions.

Referring to FIG. 7, a hydrophone 600 is supported by the scanner 610, which moves the hydrophone 600 to different positions. As shown in FIG. 8, the scanner 610 can be translated to move the hydrophone 600 from Position 1, to Position 2, to Position 3, and so on. FIG. 8 illustrates the hydrophone 600 being moved in a counter-clockwise direction, however, other sequences and patterns of movements can be utilized. Further, a hydrophone 600 can be moved to occupy various numbers of positions. Additionally, different starting points or positions can be utilized. Thus, FIGS. 7 and 8 are intended to generally illustrate embodiments involving moving a hydrophone 600 being moved to different positions, and persons skilled in the art will appreciate that this can be done in various ways.

Figure 9A:
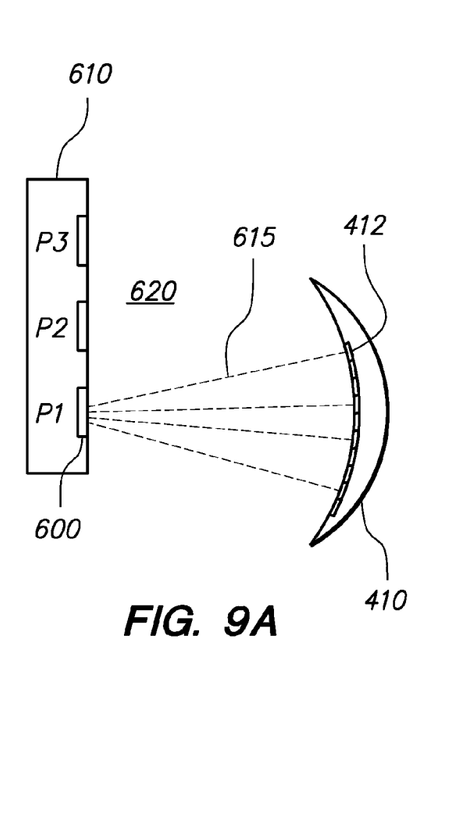
FIGS. 9A-C are top views of a spherical transducer and illustrating a transducer element being activated relative to a sensor at three different positions.

Referring to FIG. 9A, when the hydrophone 600 occupies Position 1, each element 412 of the transducer 400 is activated for a short duration, for example, about 20 cycles or other suitable numbers of cycles to form a pulse 615. FIG. 9A illustrates a pulse 615 being emitted from four elements 412 for purposes of illustration, but a pulse can be emitted from all of the elements 412. The time "t" or the "time of flight" of the pulse 615 from the time the pulse 615 is emitted from a transducer element 412 and detected by the hydrophone 600 at Position 1 is measured. Transducer elements 412 and the hydrophone 600 can be synchronized with each other to ensure accurate timing and measurements.

Figure 9B:
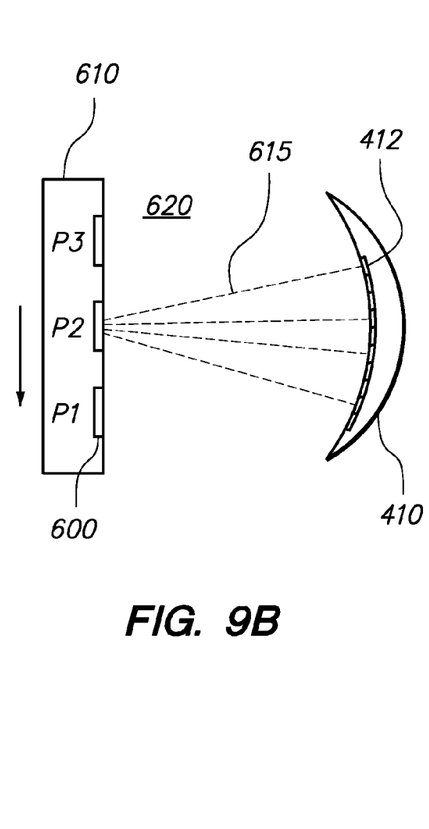

After the time of flight measurements are completed for the elements 412 at Position 1, the scanner 610 moves the hydrophone 600 to Position 2 (FIG. 9B). The time of flight measurements are repeated for the elements 412 at Position 2. After the time of flight measurements are completed at Position 2, the scanner 600 moves the hydrophone 610 to Position 3 (FIG. 9C), and time of flight measurements are repeated. The time of flight measurements are then used to determine the actual position of each transducer element 412 to map the surface 414 of the transducer 410.

Figure 10:
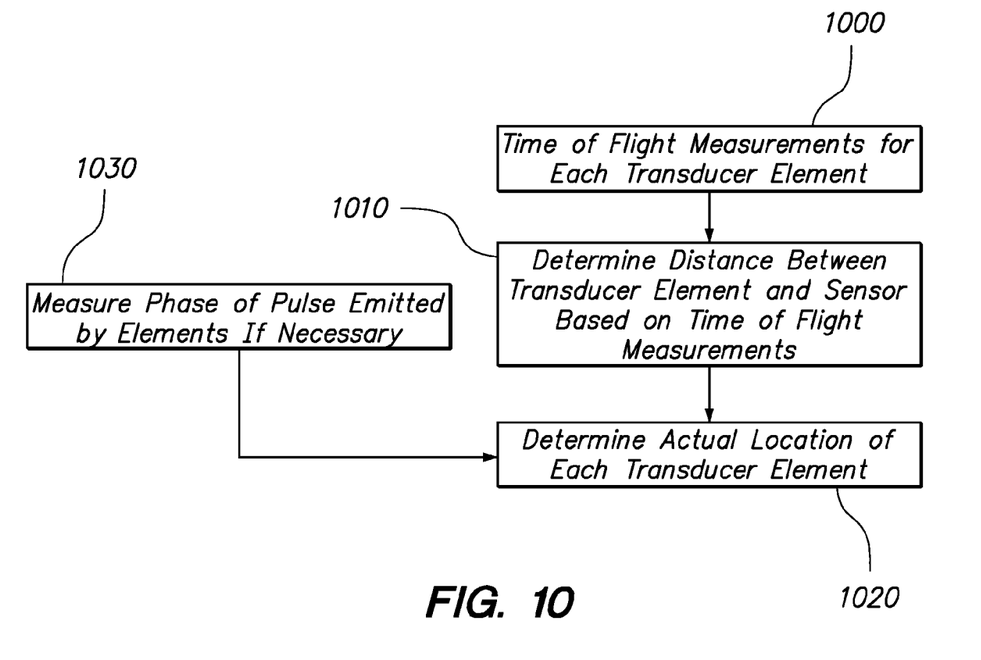
FIG. 10 is a flow chart illustrating determination of an actual location of a transducer element using time of flight measurements according to one embodiment.

More specifically, referring to FIG. 10, in step 1000, the time of flight "t" measurements are completed for each transducer element 412 at each desired position, and in step 1010, the distance between the transducer element 412 and the hydrophone 610 is determined using known methods. The medium 620 through which a pulse 615 travels, e.g., water, is known. Further, the speed at which a pulse 615 travels through water 620 and the time of flight values are known. The distance D between an individual transducer element 412 and the hydrophone 600 can be determined according to D=vt, wherein "v" is the sound velocity in the water medium 620 and "t" is the time of flight. In step 1020, the actual location of each transducer element 412 is determined based on these calculations.

According to one embodiment, the actual location of a transducer element 412 can be expressed as a three-dimensional coordinate (x,y,z). Three time of flight measurements and three corresponding distance calculations can be used to determine the actual three-dimensional location or coordinate of a transducer element 412 relative to a reference point. This can be done, for example, by triangulation or other known mathematic and geometric principles.

For example, coordinates of the hydrophone positions are known (by the scanner control). The hydrophone coordinates at a first position, Position 1, are represented by (Xh, Yh, Zh), and coordinates of the transducer element, e.g., transducer element number "k", are represented by (Xk, Yk, Zk). The measured times of flight are represented by Dik. The actual three-dimensional location or coordinate of a given transducer element 412 can be determined based on $Dik^2=(Xk-Xh)^2+(Yk-Yh)^2+(Zk-Zh)^2$.

For a specific transducer element number k, there are three unknowns: Xk, Yk, Zk. However, all of the other variables are measured either acoustically or by the scanner control. Data at three different locations or positions can be used to determine the three-dimensional coordinates of an actual location of transducer element number k and actual locations of each transducer element to obtain a full spatial mapping of the transducer surface. If necessary, to improve accuracy, additional equations can be generated and solved with additional measurements at other positions (e.g., 30 positions). Further, various known statistical methods, e.g., linearization and minimum variance methods, can be used to solve redundant equations. Accordingly, the above measurements and methods of determining actual transducer coordinates are provided for purposes of explanation and illustration, not limitation.

If necessary, in step 1030, the phase of the pulse emitted by each transducer element 412 can also be used to determine the actual (x,y,z) location of each element 412 to provide further accuracy to the actual position of a transducer element 412. For example, this can be done using correlation methods to allow distances to be calculated with improved accuracy. For example, at a transducer output of about 1 MHz, distance accuracy can be about 0.1 mm or better.

Figure 11:
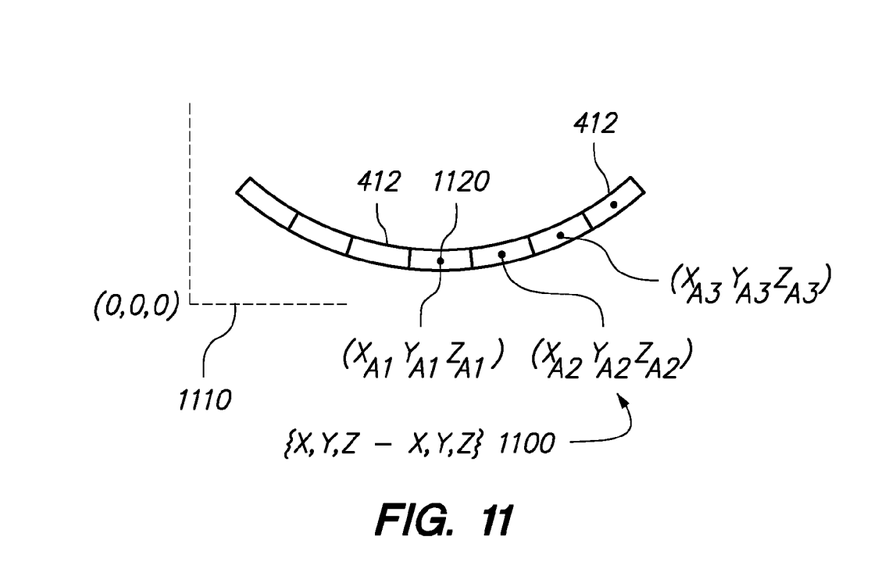
FIG. 11 illustrates coordinates of actual locations of transducer elements.

Referring to FIG. 11, the result of the time of flight measurements and distance calculations is a set 1100 of coordinates representing the actual locations of each transducer elements 412 relative to a fixed or reference coordinate 1110. For example, the actual coordinates of a first transducer element 412 are represented as $(X_{A1}, Y_{A1}, Z_{A1})$, and the actual coordinates of a second transducer element 412 are represented as $(X_{A2}, Y_{A2}, Z_{A2})$. In the illustrated embodiment, the (x,y,z) coordinates of the actual location of a transducer element are determined relative to center 1120 of the body of a transducer element 412, such as the center of gravity. Alternatively, the coordinates can be based on other points of a transducer element 412, such as the middle point on the top surface of the element. For purposes of explanation and illustration, this specification refers to actual coordinates 1120 with reference to the center 1120 of a transducer element 412.

Figure 12:
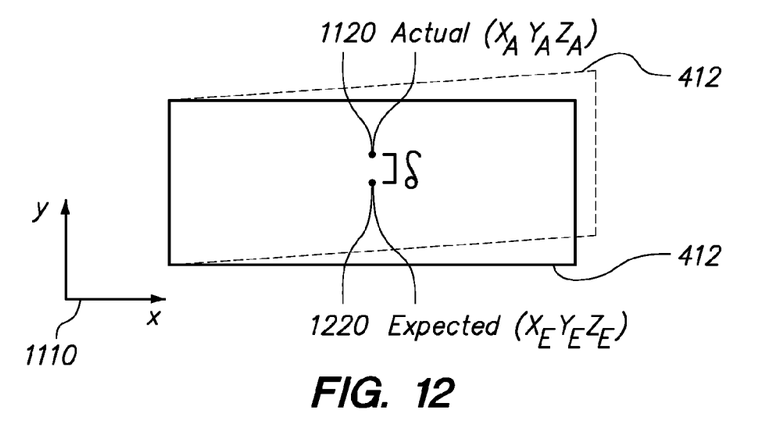
FIG. 12 illustrates a deviation of an actual location relative to an expected location of a transducer element.

The actual location 1120 of a transducer element 412 may or may not deviate from the expected location of the element. For example, FIG. 12 illustrates a transducer element 412 having an actual location 1120 that deviates from the expected location 1220. In this example, the actual location 1120 of the transducer element 412 varies by a value δ in the "y" direction. The variation may also occur in the "x" and "z" directions, but FIG. 12 shows a variation in the "y" direction for purposes of illustration. Thus, the actual locations 1120 of one or more or all of the transducer elements 412 may vary from the expected location in one, two or three directions.

In the illustrated example, a deviation from the expected position 1220 can be expressed as the distance δ between the center of the transducer element at its actual location and the center of the transducer element at its expected location. In other words, a deviation can be expressed as the magnitude of a vector between the center 1120 of a transducer element 412 at its actual location and the center of a transducer element at its expected location. Alternatively, deviations can be expressed as deviations in each of the x, y and z directions, e.g., (δx,δy,δz).

In the embodiments described above, actual locations 1120 and expected locations 1220 of transducer elements 412 are represented in three dimensions (x,y,z). Alternatively, actual locations 1120 and expected locations 1220 can be represented in one or two dimensions depending on, for example, the number of deviations in the transducer surface 414 and the desired accuracy.

For example, in some cases, it may be sufficient to determine the actual location 1120 of a transducer element 412 as a 1-D coordinate $(x_1)$ or as a linear displacement if it is known that the deviation in the shape or location of a transducer surface 414 occurs in only one dimension. One example of such a one-dimensional deviation is shown in FIG. 1, in which the surface is shifted vertically. This displacement can be measured based on a normal to the transducer surface 414.

As a further example, it may be sufficient to determine the actual location 1120 of a transducer element 412 as a 2-D coordinate $(x_1\ y_1)$ if it is known that a deviation in the shape or location of a transducer surface 414 occurs in only two dimensions and one dimension is known or fixed. In this case, a first pulse 615 can be emitted from a transducer element 412 to a first hydrophone 600 at a first position, and a second pulse 615 can be emitted from the transducer element 412 to a second hydrophone 600 or a hydrophone at a second position. The actual location of the element 412 can be determined with these two pulses using known mathematics and geometries since the speed of a pulse is known, the mediums through which the pulse travels is known, and the time of flight measurements are known.

Thus, embodiments can be used to express the actual and expected locations of transducer elements in one, two and three dimensions. For purposes of explanation, this specification refers to actual and expected locations being represented in three dimensions.

Figure 9C:
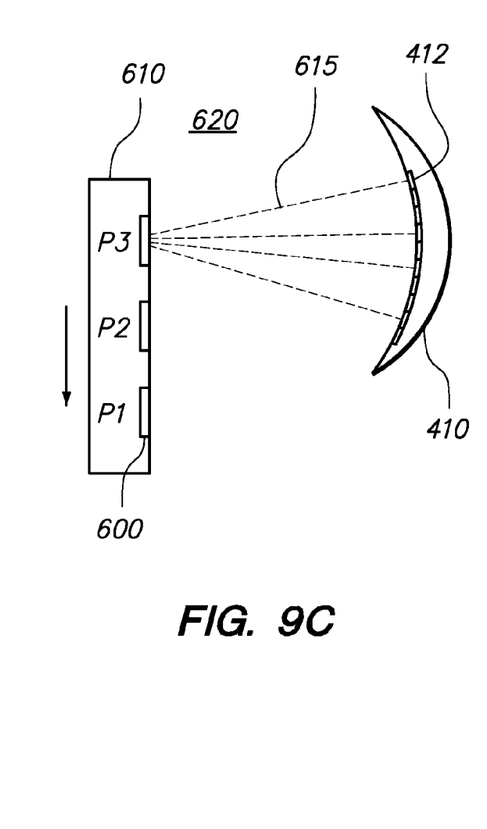

Further, alternative embodiments can utilize different systems and methods for determining the distance between a transducer element 412 and a hydrophone 600. According to one embodiment, as shown in FIGS. 9A-C, a pulse 615 can be emitted from a transducer element 412 when the hydrophone 600 is at a first position, and this is repeated when the hydrophone is at second and third positions. Thus, in this embodiment, the hydrophone 600 is moved to different positions relative to a fixed transducer 410.

Figures 13, 14:
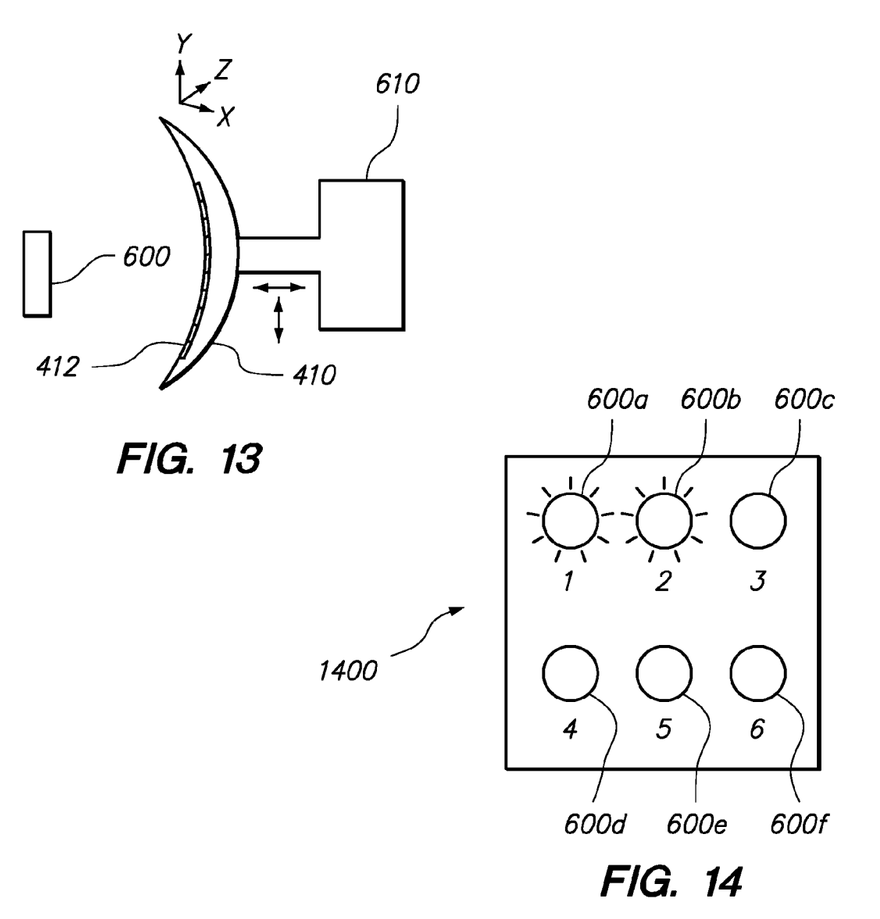
FIG. 13 shows a system for mapping a surface of an ultrasonic transducer in which a transducer is moved or translated relative to a fixed sensor according to another embodiment.
FIG. 14 illustrates an array of sensors that is used to detect the output of transducer elements according to a further embodiment.

Referring to FIG. 13, in an alternative embodiment, a system is configured so that the position of a hydrophone 600 is fixed, and the transducer 410 is translated so that transducer elements 412 are moved relative to the fixed hydrophone 600 to map the surface 414 of the transducer 600. The same time of flight measurements, distance determinations, actual position determinations and phase measurements as described above can be performed.

In a further alternative embodiment, referring to FIG. 14, an array 1400 of hydrophones 600a-f can be utilized rather than a single hydrophone. In this embodiment, a first hydrophone 600a of the array 1400 can be activated, and a transducer element 412 is activated to emit a pulse 615, which is detected by the first hydrophone 600a. The time of flight measurements and distance and actual position determinations are performed as described above. The first hydrophone can then be deactivated, and a second hydrophone 600b of the array 1400 is activated. Transducer elements 412 are activated to emit pulses, which are detected by the second hydrophone 600b. A similar procedure is followed with respect to the third hydrophone 600c and any additional hydrophones. Using a hydrophone array 1400 can eliminate moving at least one of the hydrophone and a scanner.

As discussed above, one hydrophone 600 is deactivated and another hydrophone 600 is activated in a sequential manner. Alternatively, multiple hydrophones 600 of the array 1400 can be active simultaneously. In this embodiment, a single pulse 615 can be emitted from a transducer element 412, and the single pulse 615 can be detected by multiple hydrophones 600 at the same time. Thus, if a pulse is detected by at least three hydrophones simultaneously, the three time of flight measurements (or additional time of flight measurements if further accuracy is desired, can be used to determine the actual location 1120 of the element. Alternatively, a matrix of receiving elements can be used.

Accordingly, the actual position 1120 of each transducer element 412 can be determined using a static transducer 410 and a moveable hydrophone 600, a moveable transducer 410 and a static hydrophone 600, a moveable transducer 410 and a moveable hydrophone 600, and a hydrophone array 1400. With various embodiments, the result of the time of flight measurements, distance determinations and actual position determinations is a set 1100 of coordinates or data representing the actual location 1020 of each transducer element, 412 whether expressed as one, two or three-dimensional coordinates or other suitable representations or data.

Figure 15:
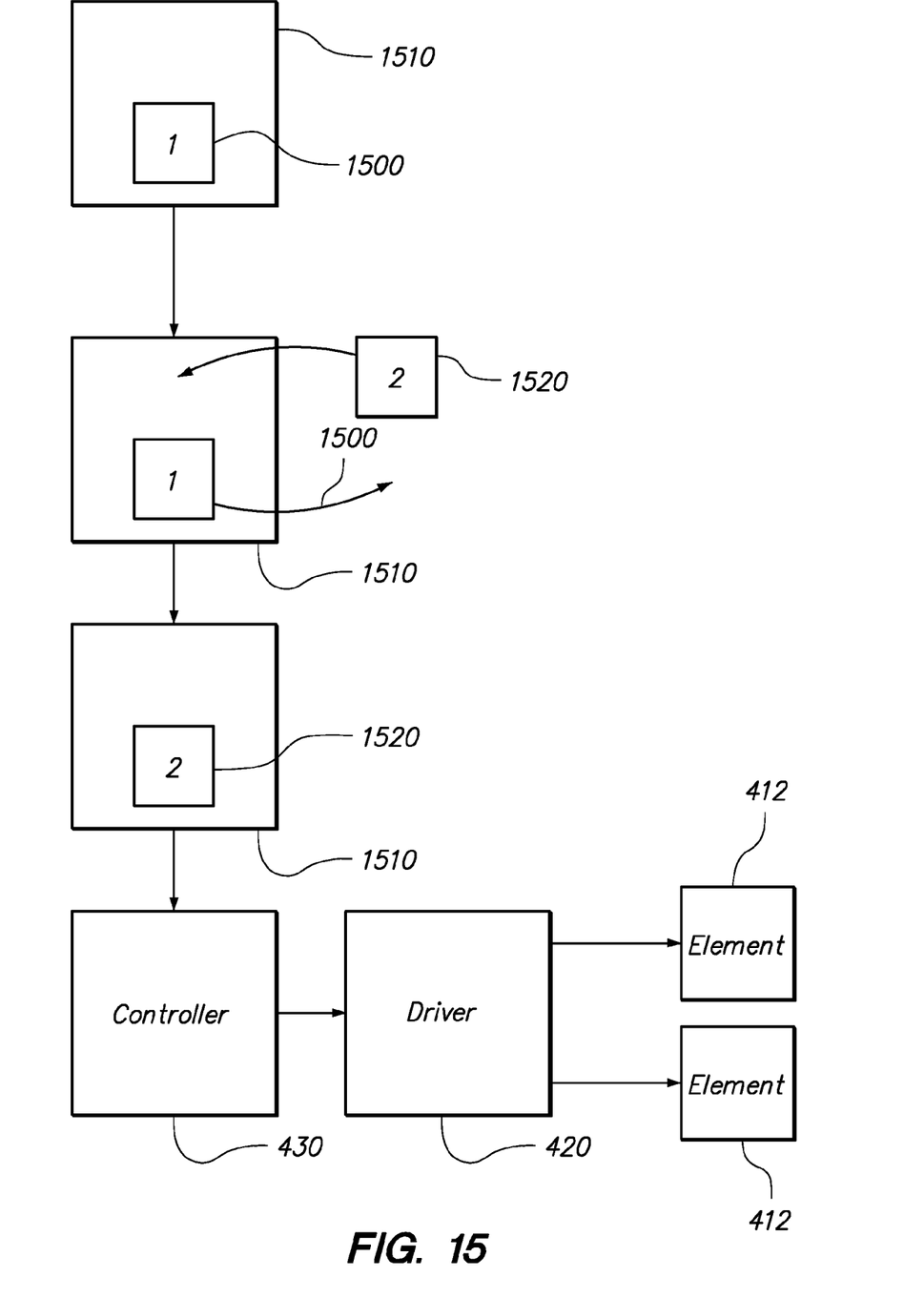
FIG. 15 is a system flow diagram illustrating of files or data sets having expected location coordinates and actual location coordinates to control transducer elements according to one embodiment.
Figure 16A:
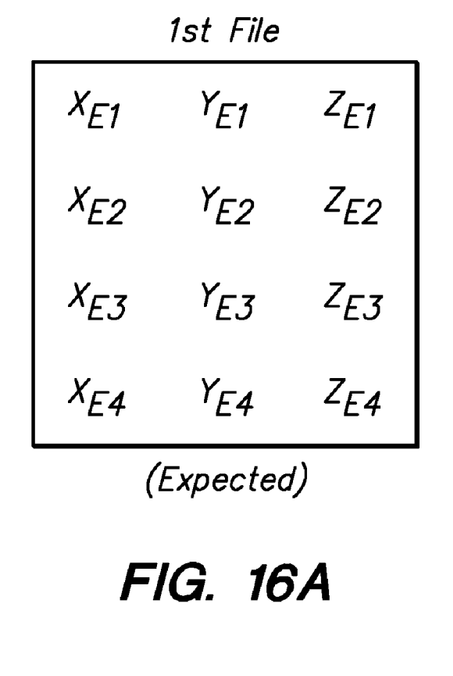
FIGS. 16A-C illustrate files having expected location coordinates, expected and actual location coordinates, and actual location coordinates of transducer elements, respectively.

Referring to FIGS. 15 and 16A-C, the actual transducer element locations 1120 are then used to control the drive signals and outputs of certain or selected transducer elements 412. In particular, FIG. 15 illustrates one embodiment in which a first file or set of data 1500 includes the expected location 1220 of each transducer element 412. The expected locations 1220 are shown in FIG. 16A as coordinates ($X_{En}$, $Y_{En}$, $Z_{En}$), where "E" subscripts refer to an expected coordinate. This first file or data set 1500 is stored memory 1510. A second file or data set 1520 can include expected locations 1220 and/or actual locations 1120. Whether an expected location 1220 or an actual location 1120 is used can depend on the degree of deviation of the particular transducer element.

According to one embodiment, a second file 1520 includes an expected location 1220 of a transducer element 412 if the actual location 1120 of the element 412 does not deviate from its expected position or if the actual location deviates from its expected position by less than a pre-determined amount relative to the expected location 1220. Alternatively, the second file 1520 can include the actual location if the actual location is sufficiently close to the expected location since, in this case, the actual and expected positions would be the same or substantially the same.

Figure 16B:
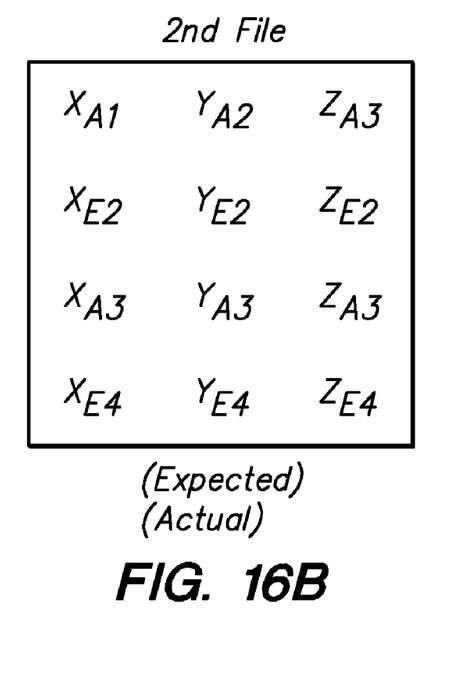
Figure 16C:
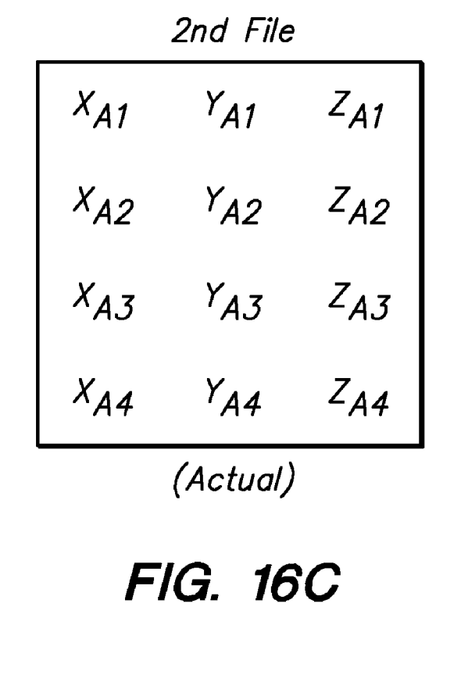

According to one embodiment, the second file 1520 includes an actual location 1120 of selected transducer elements if the actual location 1120 deviates from the expected location 1220 or if the actual location deviates from the expected location by an amount that is greater than a predetermined amount. For example, as shown in FIG. 16B, the second file 1520 includes both actual coordinates 1120 of selected elements and expected coordinates 1220 of other elements. If each element 412 deviates from its respective expected position or deviates from its expected position by an amount that is more than a predetermined amount, then the second file 1520 would include only actual location coordinates 1120, as shown in FIG. 16C.

Thus, if the result of surface mapping is that no elements 412 deviate from their expected positions, e.g., every element 412 conforms to a spherical model, then the second file 1520 can include only expected locations. Alternatively, the second file 1520 can include the actual location of each element since the actual location would be the same as or sufficiently close to the expected location since the location of the elements conform to the spherical model.

In the illustrated embodiment, the second file 1520 is stored in memory 1510 and can replace the first file 1500. The coordinate data in the second file 1520 is then provided to the controller 430, which controls characteristics of the drive signals output from the driver circuitry 420, and thus, the characteristics of the emitted ultrasonic energy and the focus of the transducer 400.

Figure 17:
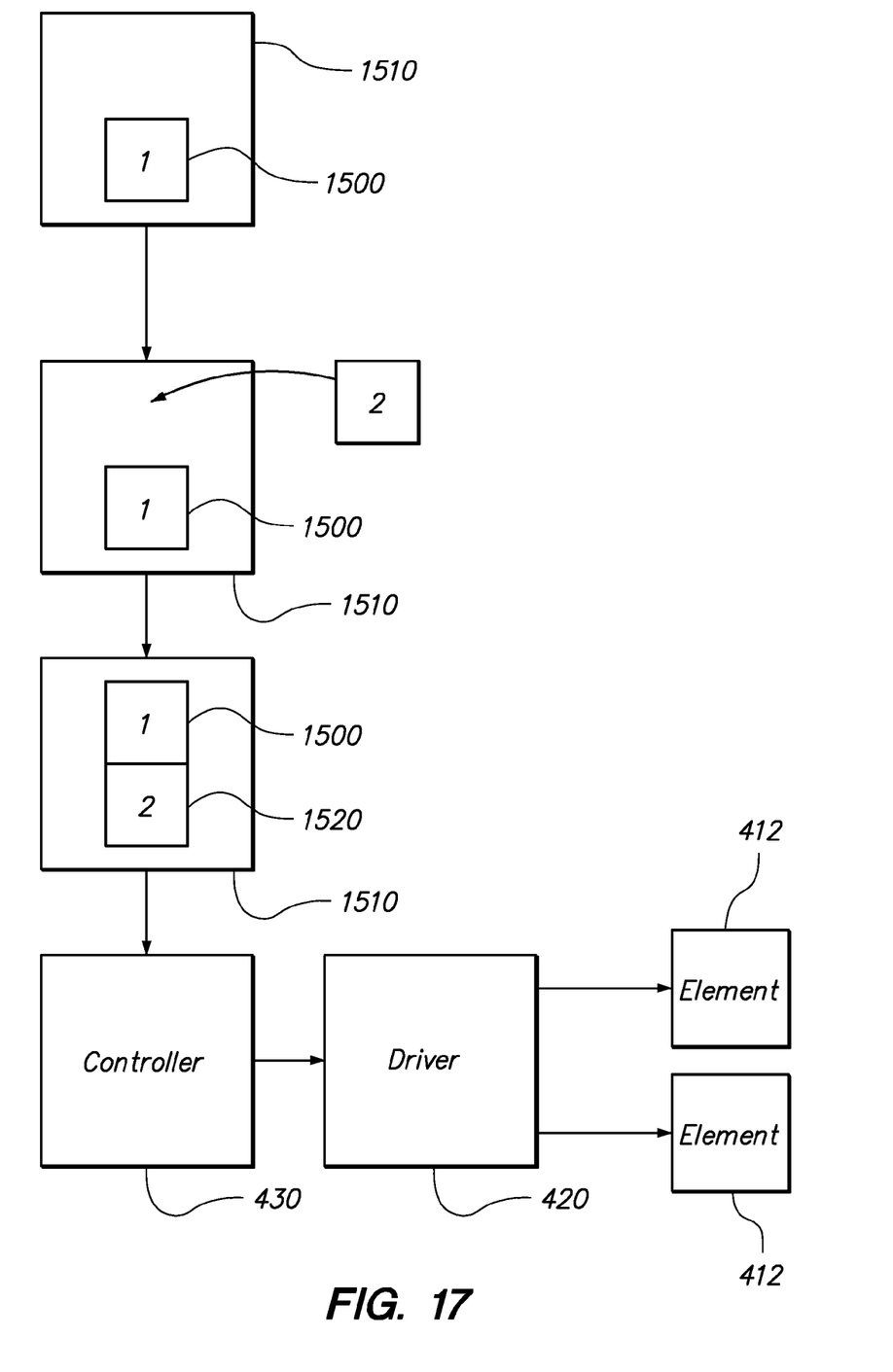
FIG. 17 is a system flow diagram illustrating files or data sets having expected location coordinates and actual location coordinates to control transducer elements according to another embodiment.

Referring to FIG. 17, in an alternative embodiment, rather than replacing the first file or data set 1500 with the second file or data set 1520, the contents of the second file 1520 can be merged into first file 1500 or supplement the first file 1500. The second file 1520 can include only actual locations 1120 of selected elements 412, and be merged into the first file 1120, replacing the expected location 1220 of selected elements 412 that deviate from the expected locations 1220 with the actual locations 1120 of those selected elements 412. For example, if a first file 1510 includes the expected position of elements 1-10, and a second file 1520 includes the actual location of selected elements 2 and 9, then the expected location data for selected elements 2 and 9 in the first file 1500 are replaced by the actual location of elements 2 and 9 from the second file 1520. The resulting or merged file would then include expected location coordinates 1220 for elements 1, 3-8 and 10 and actual location coordinates 1120 for selected elements 2 and 9. If the actual location 1120 of every element 412 deviates from the expected position 1220, then the merged file would include only actual location 1120 data.

Embodiments provide significant improvements over known transducer control systems by advantageously driving each transducer element 412 with a signal that corresponds to the actual location of the transducer element rather than relying on signals that are based on a predetermined shape or design of the transducer, which may not be representative of the actual location of a transducer element. Thus, embodiments are capable of compensating for shifts in the location of elements during manufacturing, shipping and repair. Further, embodiments advantageously compensate for element deformations that are caused by heat and/or location errors due to physical wiring errors or "virtual wiring" errors, e.g., wrong data files are used and alter the order in which elements are activated). For example, unlike transducer deformations that are observed as relatively small location deviations, wiring and data errors may be observed as large location errors and, therefore, may have patterns that are easy to detect. Thus, by using surface mapping, embodiments provide a more accurate transducer that more accurately targets tissue to be treated by compensating for transducer surface deviations and wiring and data errors.

Although particular embodiments have been shown and described, it should be understood that the above discussion is not intended to limit the scope of these embodiments. Embodiments can be used to adjust drive signals of certain transducer elements based on actual locations of transducer elements that are represented in different manners, e.g., as a coordinate, such as a one, two or three dimensional coordinate as necessary. For example, if it is determined that a transducer element moves primarily in one direction but that the other two directions remain substantially the same, then the actual location data in one direction and expected location data in the two other directions can be utilized to determine the actual location of each transducer element. Further, deformations that are tangent to the transducer element (in the "x" and "y" directions) may be negligible if movement of a transducer element occurs primarily in a direction that is perpendicular to the transducer surface (e.g., a "z" direction). Thus, various changes and modifications may be made without departing from the scope of the claims, and embodiments are intended to cover alternatives, modifications, and equivalents that may fall within the scope of the claims.

What is claimed is:

1. A method of mapping a surface of a multi-element transducer comprising:
   measuring a time of flight of a pulse emitted from each transducer element and detected by a sensor;
   determining a distance between each transducer element and the sensor based on the time of flight; and
   determining the actual location of each transducer element based on the determined distance.

2. The method of claim 1, determining the distance further comprising:
   measuring a time of flight of a first pulse emitted by a transducer element and detected by a sensor;
   moving the sensor from a first location to a second location; and
   measuring the time of flight of a second pulse emitted by the transducer element and detected by the sensor at the second location.

3. The method of claim 1, measuring the time of flight further comprising
   measuring a time of flight of a pulse emitted by a transducer element and detected by a hydrophone.

4. The method of claim 3, determining the distance further comprising
   determining a distance between each transducer element and one or more hydrophones of a hydrophone array.

5. The method of claim 4, further comprising:
   activating a first hydrophone of the hydrophone array;
   measuring a first time of flight of a pulse emitted by a transducer element and detected by the first hydrophone; and
   determining a first distance between the transducer element and the first hydrophone based on the measured first time of flight, the determined first distance being used to determine the actual location of the transducer element.

6. The method of claim 5, further comprising
   activating a second hydrophone of the hydrophone array;
   measuring a second time of flight of a pulse emitted by the transducer element and detected by the second hydrophone; and
   determining a second distance between the transducer element and the second hydrophone based on the measured second time of flight, the determined first and second distances being used to determine the actual location of the transducer element.

7. The method of claim 6, wherein the first and second hydrophones are active at the same time.

8. The method of claim 6, further comprising deactivating the first hydrophone, wherein the first and second hydrophones are sequentially activated so that the first hydrophone is not active when the second hydrophone is active.

9. The method of claim 1, mapping the transducer surface being performed by moving a sensor relative to a transducer, or by moving the transducer relative to a fixed sensor.

10. A method of controlling an output of a multi-element ultrasonic transducer, comprising:
    mapping a surface of the transducer by determining an actual location of each transducer element of the transducer; and
    adjusting a drive signal of one or more transducer elements based on a comparison of the actual location and the expected location of each transducer, thereby adjusting the output of the transducer.

11. The method of claim 10, a focus or a shape of a beam generated by the transducer being adjusted.

12. The method of claim 10, a drive signal of a transducer element being adjusted using the actual location of the transducer element if the actual location of the transducer element deviates from an expected location of the transducer element by a predetermined amount.

13. The method of claim 10, drive signals of certain transducer elements being adjusted based on respective actual locations of the certain transducer elements, and drive signals of other transducer elements being based on respective expected locations of the other transducer elements.

14. The method of claim 10, the expected location of a transducer element being based on a shape or design of a surface of the phased array ultrasonic transducer.

15. The method of claim 10, mapping the surface further comprising:
    measuring a time of flight of a pulse emitted from each transducer element and detected by a sensor;

determining a distance between each transducer element and the sensor based on the time of flight; and determining the actual location of each transducer element based on the determined distance.

16. The method of claim 15, determining the distance further comprising:

measuring a time of flight of a first pulse emitted by a transducer element and detected by a sensor;

moving the transducer from a first location to a second location; and measuring the time of flight of a second pulse emitted by the transducer element and detected by the sensor at the second location.

17. The method of claim 15, determining the distance further comprising:

measuring a time of flight of a first pulse emitted by a transducer element and detected by a sensor;

moving the sensor from a first location to a second location; and measuring the time of flight of a second pulse emitted by the transducer element and detected by the sensor at the second location.

18. The method of claim 15, measuring the time of flight further comprising measuring a time of flight of a pulse emitted by a transducer element and detected by a hydrophone.

19. The method of claim 18, determining the distance further comprising determining a distance between each transducer element and one or more hydrophones of a hydrophone array.

20. The method of claim 19, further comprising:

activating a first hydrophone of the hydrophone array;

measuring a first time of flight of a pulse emitted by a transducer element and detected by the first hydrophone; and determining a first distance between the transducer element and the first hydrophone based on the measured first time of flight, the determined first distance being used to determine the actual location of the transducer element;

activating a second hydrophone of the hydrophone array;

measuring a second time of flight of a pulse emitted by the transducer element and detected by the second hydrophone; and determining a second distance between the transducer element and the second hydrophone based on the measured second time of flight, the determined first and second distances being used to determine the actual location of the transducer element.

21. The method of claim 20, wherein the first and second hydrophones are active at the same time.

22. The method of claim 20, further comprising deactivating the first hydrophone, wherein the first and second hydrophones are sequentially activated so that the first hydrophone is not active when the second hydrophone is active.

23. The method of claim 10, mapping the transducer surface being performed by moving a sensor relative to a transducer, or by moving the transducer relative to a fixed sensor.

24. The method of claim 10, further comprising generating an initial file having the expected location of each transducer element based on a design of the transducer;

determining whether the actual location of each transducer element deviates from expected location the transducer element based on the initial file;

generating an updated file having the actual locations of transducer elements that deviate from the expected locations; and adjusting a drive signal of a transducer element based on the updated file.

25. The method of claim 24, generating the initial file comprising generating an initial file having expected coordinates of each transducer element, and generating the updated file comprising generating an updated file including actual coordinates of certain transducer elements having an actual location that deviates from the expected location, and expected coordinates of other transducer elements.

26. A method of controlling an output of a multi-element ultrasonic transducer, comprising:

generating an initial file having an expected location of each transducer element of the transducer based on a shape or design of a surface of the transducer;

mapping the surface of the transducer by determining, for each transducer element, an actual location of the transducer element relative to an expected location of the transducer element;

comparing the actual locations of the transducer element to respective expected locations of the transducer elements;

generating an updated file including actual locations of transducer elements having an actual location that deviates from the expected location; and adjusting drive signals of transducer elements using the updated file, thereby adjusting the output of the transducer.

27. The method of claim 26, generating the initial file comprising generating an initial file having expected (x,y,z) coordinates of each transducer element, and generating the updated file comprising generating an updated file including actual (x,y,z) coordinates of selected transducer elements having actual locations that deviate from the expected locations of the respective selected transducer elements, and expected (x,y,z) coordinates of other transducer elements.

28. The method of claim 26, a focus or a shape of a beam generated by the transducer being adjusted.

29. The method of claim 26, drive signals of certain transducer elements being adjusted based on respective actual locations of the certain transducer elements, and drive signals of other transducer elements being based on respective expected locations of the other transducer elements.

30. The method of claim 26, mapping the surface of the phased array ultrasonic transducer comprising:

measuring a time of flight of a pulse emitted from each transducer element and detected by a sensor;

determining a distance between each transducer element and the sensor based on the time of flight; and determining the actual location of each transducer element based on the determined distance.

31. A method of controlling an output of a phased array ultrasonic transducer having a plurality of transducer elements, comprising:

generating an initial file having the expected (x,y,z) location of each transducer element based on a shape or a design of the phased array ultrasonic transducer;

mapping the surface of the phased array ultrasonic transducer to determine the actual (x,y,z) location of each transducer element relative to an expected location of the transducer element, mapping the surface further comprising measuring a time of flight of a pulse emitted from each transducer element and detected by a sensor, determining a distance between each transducer element and the sensor based on the time of flight, and determining the actual location of each transducer element based on the determined distance;

comparing the actual locations of transducer elements and respective expected locations of transducer elements;

generating an updated file having actual locations of certain transducer elements if the actual location of a transducer element deviates from the expected location of the transducer element; and adjusting drive signals of certain transducer elements based on the updated file to control the output of the phased array ultrasonic transducer.

* * * * *